Nov. 29, 1938.  M. PERR  2,138,013
SUPPORT COUPLER FOR GASEOUS VAPOR ELECTRIC LAMPS
Filed July 6, 1938
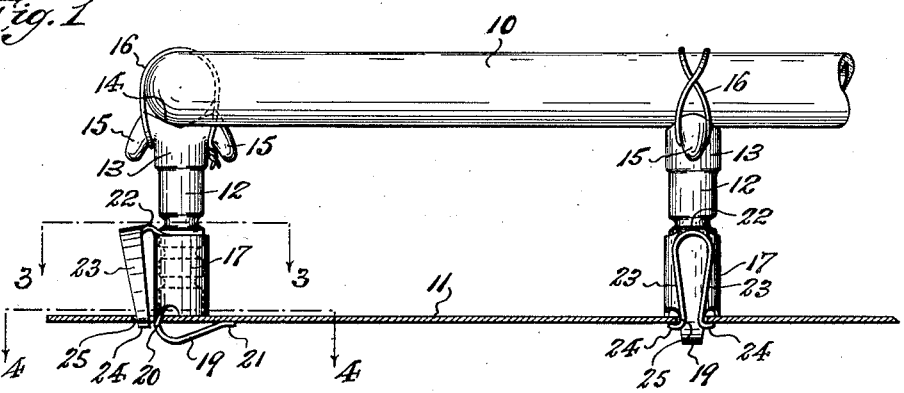
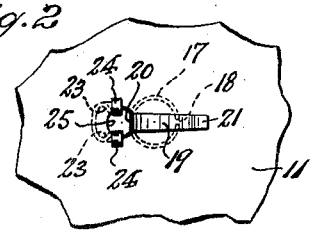
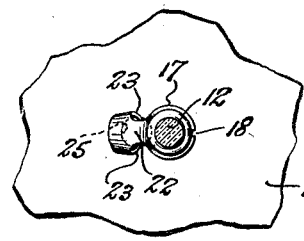
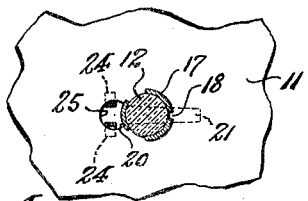
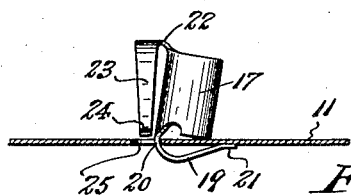
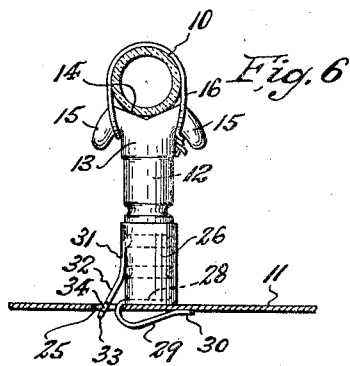
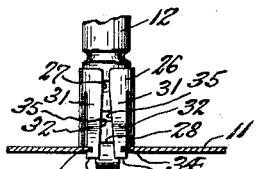
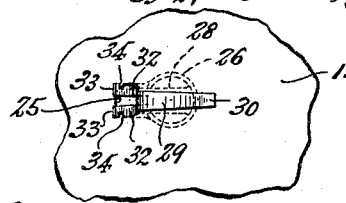
INVENTOR.
Martin Perr,
BY George D. Richards
ATTORNEY.

Patented Nov. 29, 1938

2,138,013

UNITED STATES PATENT OFFICE 2,138,013

SUPPORT COUPLER FOR GASEOUS VAPOR ELECTRIC LAMPS

Martin Perr, Newark, N. J.

Application July 6, 1938, Serial No. 217,653

7 Claims. (Cl. 24—81)

This invention relates to improvements in support coupler means for gaseous vapor electric lamps, such e. g. as neon tubes and the like; and the invention has reference, more particularly, to a novel coupling means for anchoring the supporting posts or brackets, which carry such lamp tubes, to a base.

This invention has for an object to provide a novel coupler for the purposes stated which is adapted to embrace and hold a lamp tube supporting bracket, said coupler having novel means to interlock the same in affixed anchored relation to a base over which the lamp tube is extended; said interlocking means being easily and quickly manipulatable for attaching the same to or detaching it from the base, and being so devised as to eliminate all necessity for the use of separable fastener elements, such as screws, bolts, rivets or the like.

This invention has for a further object to provide a support coupler having, as unitary parts thereof, novel manipulatable anchoring means for attaching the same to a base; said anchoring means operating to hold the support coupler body in firmly engaged relation to the base in such manner as to avoid all risk of accidental detachment, displacement or loosening.

Other objects of this invention, not at this time more particularly enumerated, will be understood from the following detailed description of the same.

Illustrative embodiments of the novel support coupler means according to this invention are shown in the accompanying drawing, in which:—

Fig. 1 is an elevational view showing a lamp tube and supporting brackets or posts therefor, the latter being coupled to a base over which the lamp tube extends by means of novel self-anchoring coupler devices according to this invention;

Fig. 2 is a bottom plan view showing the operative relation of the coupler anchoring means to the base; Figs. 3 and 4 are horizontal sectional views, respectively taken on lines 3—3 and 4—4 in Fig. 1; and Fig. 5 is an elevational view of a coupler device about to be moved into attached and anchored relation to the base.

Figs. 6 and 7 are respectively elevational views showing support couplers having anchoring means of modified form; and Fig. 8 is a bottom plan view showing the operative relation of said modified form of coupler anchoring means to a base.

Similar characters of reference are employed in the above described views, to indicate corresponding parts.

Referring to the drawing, the reference character 10 indicates an electric lamp of the gaseous vapor type, such as a neon tube. Lamp tubes of this character are capable of being wrought into various desired shapes, and are largely used for illuminated sign construction, in which the lamp tube is suitably shaped to spell out names, advertising matter, symbols, designs, etc. Such lamp tubes are usually mounted to extend over a suitable base from which the same are supported. The base ordinarily includes a face plate 11, which is usually formed from sheet metal. The lamp tube 10 is mounted upon supporting brackets which are fixed in upstanding relation to the face plate 11, i. e. perpendicular to the plane of the latter. Said supporting brackets are generally made of glass, and comprise a cylindrical body or post 12 having a head 13 provided with shallow V-shaped seat 14 for disposition transverse to the axis of the lamp tube, and upon which the latter rests. Dependent from the head 13, at each side of the seat 14, are divergent hook-like elements or ears 15, the latter being utilized to engage and hold loops of a tie wire 16 which is passed from one to the other and over the lamp tube, thus tying the latter down upon the seat 14 against displacement therefrom. Means must be provided for coupling the lower end of the supporting bracket body or post 12 to the face plate 11 of the base. According to the instant invention, the coupling means to serve this purpose comprises, in one illustrative form thereof, a cylindrical socket member 17, having a longitudinal slit 18 extending from top to bottom thereof, whereby the same is yieldably resilient laterally upon insertion of the lower end of the supporting bracket or post 12 thereinto, so as to frictionally embrace and hold the latter in operative assembled relation thereto. Formed integrally with the lower end of said socket member 17, to extend from a side thereof which is preferably diametrically opposite to the side in which said slit 18 is located, is a bottom clamp tongue 19. This clamp tongue 19 extends diametrically across the bottom end of said socket member, and is connected to the latter by a curved butt portion 20 from which it inclines upwardly and laterally toward the socket member bottom to terminate in a free end portion 21 extending beyond the boundary of said socket member bottom. The inherent resiliency of said clamp tongue 19 yieldably urges the latter in an upward direction or toward said socket member bottom. Formed integrally with the upper end of said socket member 17, to also extend outwardly from the side thereof which is diametrically opposite to the side in which said slit 18 is located, is a radial extension or arm 22 from the respective opposite sides of which extend downwardly projected resilient locking arms 23. These locking arms 23 are of such length that their free end portions extend somewhat below the plane of the bottom end of said socket member 17, said end portions terminating in outwardly and laterally projected anchor lugs 24. Instead of two locking arms, a single locking arm may be employed, if desired.

Provided in the base face plate 11, at points where it is desired to locate and attach the lamp tube supporting brackets, are openings or perforations 25 of suitable size, and preferably of circular form. To affix the socket member 17 in anchored relation to the base face plate 11, the clamp tongue 19 is inserted through an opening or perforation 25 therein, so that the same extends along the under or inner side of said face plate 11, with its free end portion 21 engaged therewith to press or thrust resiliently upward against the same. When the clamp tongue 19 is initially entered through said opening or perforation 25 of the base face plate 11, and the socket member 17 is tipped or inclined in the manner shown in Fig. 5, the free end portions of the locking arms 23 will be disposed above the face plate opening or perforation 25. When said locking arms 23 are thus disposed, the operator grasps the same between a finger and thumb so as to pinch the same and thereby cause a movement thereof one toward the other. Such movement of the locking arms 23 will cause their free end portions and the anchor lugs 24 connected therewith to move together sufficiently to allow the latter to register within the bounds of the opening or perforation 25, whereupon by a downward thrust upon the locking arms said anchor lugs 24 will be caused to pass through the opening or perforation 25, while at the same time the bottom end of the socket member 17 will be brought down and firmly footed upon the surface of the base face plate 11. After this occurs the operator releases the contracting pressure exerted upon the locking arms 23, whereupon the inherent resiliency thereof causes the same to spread apart until stopped by abutment against the margins of the opening or perforation 25, with the consequence that the anchor lugs 24 will be projected over the under or inner surface of said face plate 11 adjacent to the opening or perforation 25 so as to interlock the socket member 17 in affixed assembled relation to said base face plate 11. It will be obvious from the above description and from an ispection of the drawing, that the clamp tongue 19, owing to its resilient tensional bearing against the under or inner side of the base face plate 11, will draw downward and hold the lower end of the socket member 17 firmly footed upon the upper or outer face of the base face plate, while at the same time, owing to the relative spaced relation of the bearing end of said clamp tongue and the anchor lugs 24, these portions will provide a three point bearing impingement against the under or inner side of the base face plate 11 which firmly interlocks and holds the socket member 17 against accidental detachment, displacement or loosening from the described coupled and operative attached assemblage with said base face plate 11, thereby firmly and adequately mounting the supporting brackets, which carry the lamp tube, upon a desired base.

In Figs. 6, 7 and 8 I have shown a somewhat modified form of coupler means, which nonetheless embodies the essential principles of the instant invention. This form of the device also comprises a cylindrical socket member 26 having a longitudinal slit 27 extending from top to bottom thereof to render the socket member yieldably expandable to receive and then grip the entered butt of a supporting bracket post 12. Formed integrally with the lower end of said socket member 26, to extend, from a side thereof opposite its split side, across said lower end and toward said split side, is a base portion 28 of a clamp tongue 29, the latter doubling back beneath and across the bottom end of said socket member 26. Said clamp tongue 29 inclines upwardly and terminates in a free end portion 30 extending beyond the boundary of said socket member bottom. The inherent resiliency of said clamp tongue 29 yieldably urges the latter in an upward direction or toward said socket member bottom. Formed integrally with the split side of said socket member 26 to respectively border the margins of the slit 27 are the members of a pair of locking arms 31, the lower portions 32 of which are bent to incline somewhat outwardly and downwardly relative to the socket member exterior. Formed in the outer side margins of the end portions 33 of said locking arms 31 are laterally indented locking notches 34. The inner side margins 35 of said locking arms are inclined to give said arms a conformation laterally tapering in width toward their lower end portions 32.

To affix the above described modified form of coupler device to the base face plate 11, the clamp tongue 29 is inserted through an opening or perforation 25 of the latter, so that said clamp tongue extends along the under or inner side of said face plate 11, with its free end portion 30 engaged therewith to press or thrust resiliently upward against the same with the bottom end of the socket member 26 disposed to foot upon the upper or outer surface of said base face plate 11. When the socket member is thus positioned, the lower portions 32 of the locking arms 31 are pinched together to enter the same through the face plate opening or perforation 25, so that, when released, said locking arms 31 will spring back to normal position to thereby cause the locking notches 34 thereof to respectively engage over and receive marginal portions of said face plate opening or perforation 25, thus interlocking therewith and automatically anchoring the socket member in operative affixed relation to the base along which the lamp tube is desired to be extended in supported relation thereto.

From the above description it will be ascertained that a very simple, efficient and easily and quickly manipulatable support coupler for gaseous vapor electric lamps is provided; the same being self securing to a base without necessity of employing separable fasteners of any kind.

I am aware that many changes could be made in the above described constructions, and many apparently widely different embodiments of this invention could be made without departing from the scope thereof as defined by the following claims. It is therefore intended that all matter contained in the above description or shown in the accompanying drawing shall be interpreted as illustrative and not in a limiting sense.

I claim:—

1. A coupler device adapted to be assembled with a perforate plate for the purposes described comprising, a socket member, and anchoring elements extending from said socket member for engagement through a base plate openings, said elements being relatively disposed to provide a multiple point anchorage to said base plate to hold said socket member in attached extension from said base plate.

2. A coupler device adapted to be assembled with a perforate plate for the purposes described comprising, a resiliently expandible socket member, and resilient elements integrally formed in connection with said socket member to extend therefrom for engagement through a base plate opening, said resilient elements being relatively disposed to provide a multiple point anchorage to said plate to hold said socket member in attached substantially perpendiculiar extension from the face of said base plate.

3. A coupler device adapted to be assembled with a perforate base plate for the purposes described comprising, a socket member, a clamp tongue extending from the bottom end of said socket member for insertion through an opening of and into engagement with the rear face of the base plate and operative to hold said socket member in footed position upon the front face of the base plate, and resilient anchoring means extending from said socket member through said base plate opening and into holding engagement with marginal portions thereof.

4. A coupler device adapted to be assembled with a perforate base plate for the purposes described comprising, a resiliently expandible socket member, a resilient clamp tongue extending from and across the bottom end of said socket member and yieldably urged toward the latter by its inherent resiliency, said clamp tongue being adapted to be inserted through an opening of and into engagement with the rear face of the base plate and operative to hold the bottom end of said socket member in footed position upon the front face of the base plate, and resilient anchoring means extending from said socket member through said base plate opening and into holding engagement with marginal portions thereof.

5. A coupler device adapted to be assembled with a perforate plate for the purposes described comprising, a longitudinally split tubular socket member, a clamp tongue extending diametrically across the bottom end of said socket member and adapted to be inserted through an opening of and into engagement with the rear face of the base plate to hold the bottom end of said socket member footed upon the front face of the base plate, and a pair of downwardly directed resilient arms offset from a side of said socket member, said arms having means at their free end portions to engage with the base plate adjacent said opening thereof to anchor said socket member in its aforesaid footed relation to said base plate.

6. A coupler device adapted to be assembled with a perforate plate for the purposes described comprising, a longitudinally split tubular socket member, a resilient clamp tongue extending diametrically across the bottom end of said socket member and adapted to be inserted through an opening of and into engagement with the rear face of the base plate to hold the bottom end of said socket member footed upon the front face of the base plate, and a pair of downwardly directed resilient arms integrally connected with said socket member for insertion through said base plate opening for expansion into anchored relation to said base plate.

7. A coupler device adapted to be assembled with a perforate plate for the purposes described comprising, a resiliently expandible socket member, a resilient clamp tongue extending diametrically across the bottom end of said socket member and adapted to be inserted through an opening of and into engagement with the rear face of the base plate to hold the bottom end of said socket member footed upon the front face of the base plate, a pair of resilient locking arms extending from said socket member, said arms having downwardly directed free end portions to enter through the base plate opening, and means at the free ends of said arms adapted to be held by the tension of said arms in anchoring engagement with marginal portions of said opening.

MARTIN PERR.